United States Patent [19] [11] 3,757,032

Minerd et al. [45] Sept. 4, 1973

[54] METHOD AND APPARATUS FOR SELECTIVELY ENABLING A REMOTE RECEIVER

[75] Inventors: Timothy M. Minerd, Rochester; Robert D. Houston, Webster, both of N.Y.

[73] Assignee: Xerox Corporation, Stamford, Conn.

[22] Filed: Jan. 28, 1971

[21] Appl. No.: 110,687

Related U.S. Application Data

[63] Continuation of Ser. No. 39,687, May 20, 1970, abandoned.

[52] U.S. Cl. .............................. 178/4.1 R, 325/492

[51] Int. Cl. .............................................. H04l 15/34

[58] Field of Search ...................... 178/4.1 R, 4.1 A, 178/23 R, 17, 17.5, 30; 340/163, 167, 155; 179/41 A, 2 A, 15 AL; 325/391, 392, 341, 302, 492; 346/139 A; 343/228

[56] References Cited

UNITED STATES PATENTS

| | | | |
|---|---|---|---|
| 2,854,478 | 7/1958 | Foley | 178/4.1 |
| 3,403,381 | 9/1968 | Haner | 340/167 R |
| 3,192,527 | 6/1965 | Douglas | 340/167 R |
| 3,166,752 | 1/1965 | Waterman | 346/139 A |
| 2,852,760 | 9/1958 | Eckhardt | 340/163 |
| 3,183,444 | 5/1965 | Roschke | 325/392 |
| 2,739,180 | 3/1956 | Brit | 178/4.1 |
| 3,445,815 | 5/1969 | Saltzberg | 340/163 |
| 3,492,422 | 1/1970 | Mason | 178/26 |
| 2,912,574 | 11/1959 | Gensel | 325/492 |
| 2,941,161 | 6/1960 | Scantlin | 343/228 |
| 2,597,264 | 5/1952 | Russell | 325/492 |

*Primary Examiner*—Kathleen H. Claffy
*Assistant Examiner*—Thomas D'Amico
*Attorney*—James J. Ralabate, John E. Beck and Irving Keschner

[57] ABSTRACT

An information transmission and recording system wherein a character is arranged in a dot-matrix form and the signals which represent the dots are transmitted column by column of the matrix in serial form to a receiver. The received character signals are applied synchronously to a serial-to-parallel converter, the parallel output thereof being applied to a storage register. The output of the storage register, representing a column of the matrix, is transferred to a line of styli representing a column of the matrix. The styli are transported across a moving recording medium, the character thereby being reproduced column by column. Means are also provided for addressing a selected recording unit among a plurality of such units, full power being applied only to the selected unit after it is properly addressed.

13 Claims, 15 Drawing Figures

INVENTORS
TIMOTHY M. MINERD
ROBERT D. HOUSTON
BY
ATTORNEY

METHOD AND APPARATUS FOR SELECTIVELY ENABLING A REMOTE RECEIVER

RELATED APPLICATION

This application is a continuation of U.S. application Ser. No. 39,687, filed May 20, 1970 now abandoned.

BACKGROUND OF THE INVENTION

Printers for receiving information and for printing characters corresponding thereto are known in the prior art. These printers may be utilized in data processing systems, such as in the field of communications, for providing printed copies of messages which are transmitted over a communication channel, such as a telephone line (i.e. facsimile transmission) or a radio transmission channel.

In recent years, attention has been focused on transmitting radio messages to remote printers, or radio teleprinters, from a single transmitter at a base station. Such teleprinters would be useful for example, in police communications, wherein a message from the police dispatcher, located at the base station, can be recorded at a printer located in the police vehicle to which a message is being addressed.

Prior art radio teleprinters, or mobile printers, are limited in many respects. For example, the total amount of power consumed by the mobile printers, although only one printer may be addressed, increases the failure rate and cost of prior art printers.

With the tremendous rise in the uses and applications of digital computers in recent years has been an attendant increase in digital communication between remote terminals. Producing a mobile printer system which is compatible with digital communication techniques is therefore a desirable objective.

Ideal mobile printer systems for character transmission and reproduction should be economical, accurate, have a high degree of selectivity and be compatible with high speed digital communication systems. In addition, the mobile printers should be compact and durable for obvious reasons. Although various features of the ideal printer may be found in individual prior art systems, all these features are not found in a single prior art device.

SUMMARY OF THE INVENTION

The present invention relates to a data transmission and recording system and in particular, to a mobile printer transmission and recording system. A character is arranged in a dot-matrix form and the signals which represent the dots are transmitted column by column of the matrix in serial form to a receiver. The received signals are applied synchronously to a serial-to-parallel converter, the parallel output thereof being applied to a storage register. The output of the storage register, representing a column of the matrix, is transferred to a line of styli representing a column of the matrix. The styli are transported across a moving recording medium, the character thereby being reproduced column by column. Means are also provided for addressing a selected recording unit among a plurality of such units, full power being applied only to the selected unit after it is properly addressed.

It is an object of the present invention to provide an improved information data recording system.

It is a further object of the present invention to provide an improved character transmission and recording system particularly suited for mobile printers.

It is still a further object of the present invention to provide a data recording system which is portable, economical, accurate and compact.

It is an object of the present invention to provide a novel technique for addressing a selected printer unit wherein full power is applied only to the selected printer unit when it is properly addressed.

DESCRIPTION OF THE DRAWINGS

For a better understanding of the invention as well as other objects and further features thereof, reference is made to the following description which is to be read in conjunction with the accompanying drawings wherein.

DESCRIPTION OF THE PREFERRED EMBODIMENT

Figure 1A:
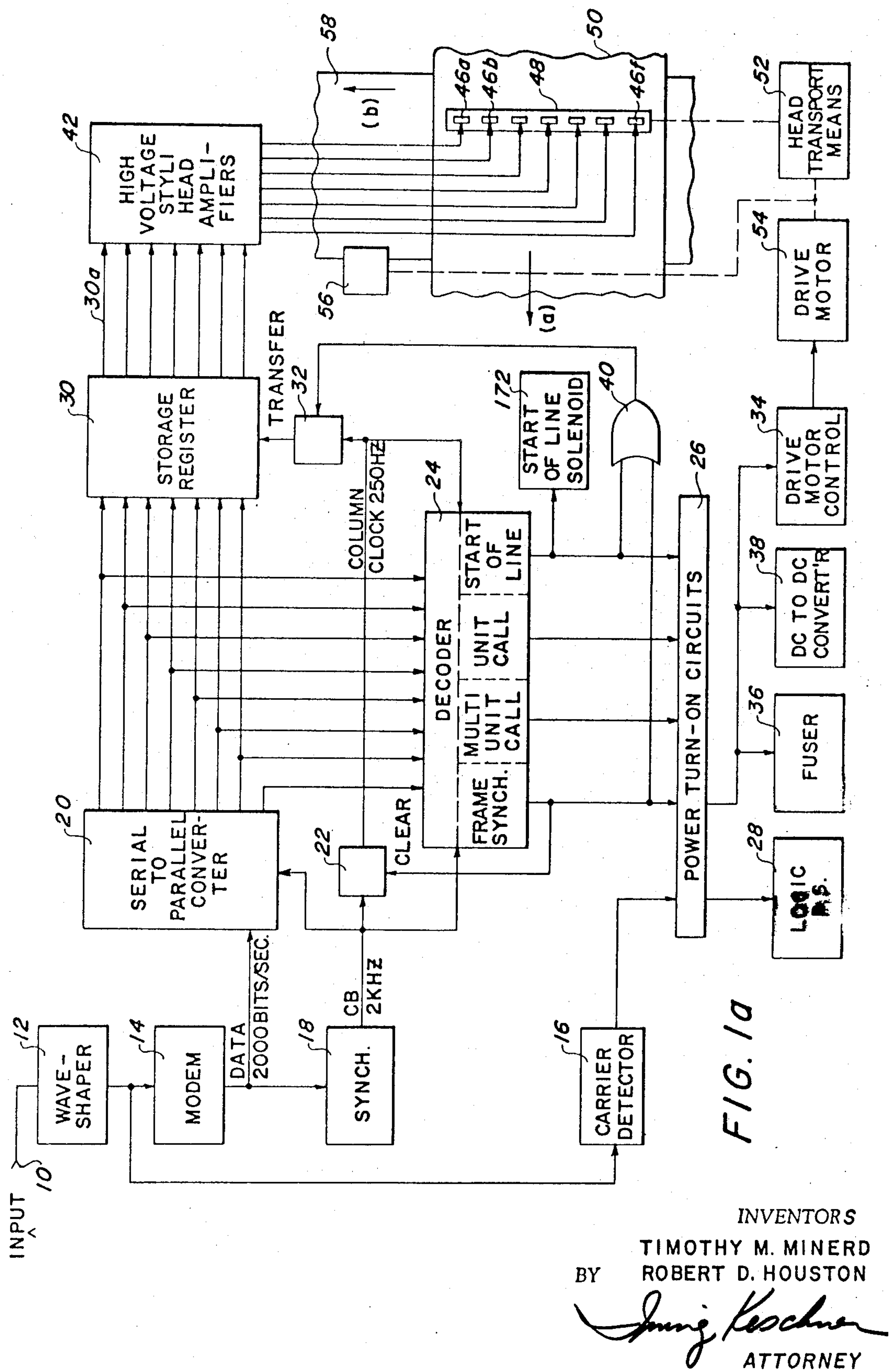
FIG. 1*a* is a block diagram of the novel recording system of the present invention.

Referring now to FIG. 1*a*, a block diagram of the novel printer unit of the present invention is illustrated. Transmitted information data, in the form of a serial bit pattern representing the character to be recorded, is received at input terminal 10, the data being transmitted, for example, from a single transmitter at a base station. In the particular embodiment illustrated, the data comprises binary signals which are transmitted by frequency modulating a carrier wave, one frequency representing a "mark", or binary "1", and another frequency representing a "space", or binary "0". This modulation technique for data transmission is known as Frequency Shift Keying (FSK). The binary 1 and binary 0 correspond to black and white, respectively, on the copy to be made.

Figure 1B:
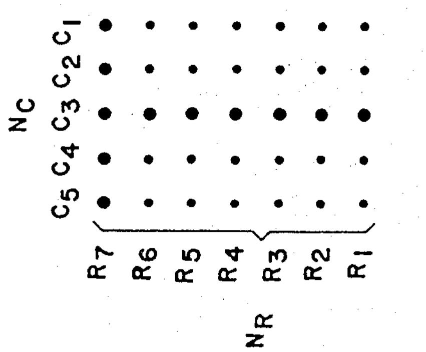
FIG. 1*b* is a typical character element matrix.

FIG. 1*b* illustrates a character matrix format which may be utilized in the present invention. The matrix comprises 35 elements arranged in seven rows R1 to R7 and 5 columns C1 to C5. The character matrix in reality does not exist as a physical structure but is the arrangement on which each character to be transmitted and recorded is formed. For illustrative purposes, the elements required to reproduce the character T are indicated by the large dots. The details of the transmitting station are not illustrated since it does not form part of the present invention. However, for purposes of explanation, it should be noted that the character to be transmitted may be generated in numerous ways. For example, 8 level ASCII character coded information from a teletypewriter or other data terminal may be translated into the serial bit/5 × 7 dot matrix representing the character to be recorded; the matirx information being shifted serially on a character interleaved basis to the frequency shift keyed modulator. The output of the modulator is then applied to the audio input of any standard base station transmitter for radio transmission to the printer unit.

The transmitted data is received at input terminal 10 and coupled to modem 14 and carrier detector 16 via waveshaper 12. Modem 14 demodulates the input data, producing a replica of the translated binary data in serial form and including $N_r$ groups of pulses, each pulse group comprising $N_c$ binary signals, encoded to represent the character in matrix form. The particular coding format will be described hereinafter with reference to FIGS. 3*a* and 3*b*. The output of modem 14, which for example, comprises 2,000 bits per second, is connected to synchronization means 18. Synchronization means 18 synchronizes a local oscillator therein with the demodulated binary data to provide accurate, locally generated clock pulses to the circuitry which follows to signal the start of each new binary signal, or bit. A synchronization circuit which may be utilized in the present invention is disclosed in copending application U.S. Ser. No. 33,805, filed May 1, 1970. The output of synchronizing means 18, a synchronized bit clock of 2,000 hertz, is coupled to one input of serial-to-parallel converter 20, one input of divider 22 and to one input of decoder 24. The serial binary data output of modem 14 is also coupled to serial-to-parallel converter 20. The serial-to-parallel converter 20, or buffer register, may be a shift register which converts the data from serial-to-parallel form. Thus the bits which represent a character appear simultaneously at the output of the converter 20 and may be transmitted over seven parallel bit channels. Since serial-to-parallel converters are well known in the art, they are not described in detail herein.

Figure 2:
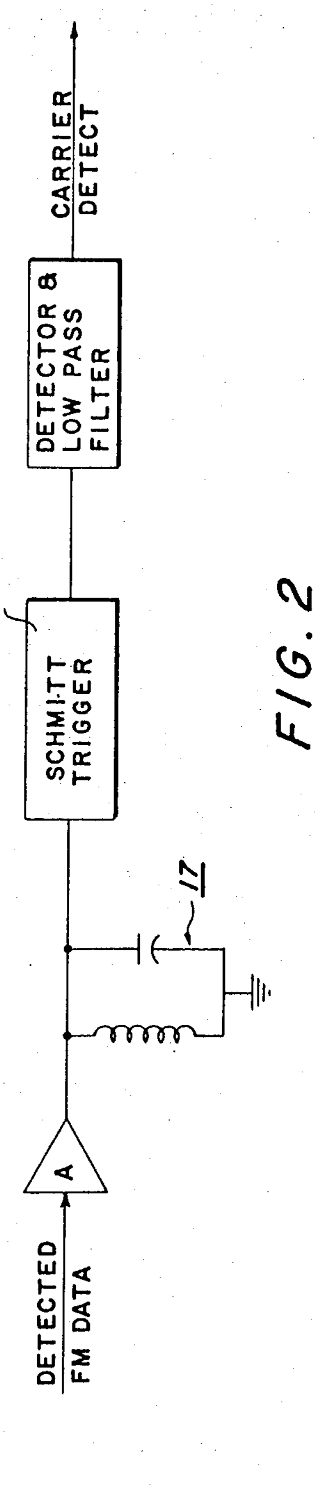
FIG. 2 is a simplified block diagram of a carrier detect unit which may be utilized in the present invention.

Carrier detector 16 detects the presence of the carrier frequency of the frequency modulated binary data. Since the magnitude of the carrier frequency during the transmission of alternate binary ones and binary zeros is at its peak magnitude, a simple parallel resonant circuit 17 in conjunction with a Schmidt trigger 19 may be utilized to implement carrier detection, as shown in FIG. 2. The output of carrier detector 16 is coupled to power turn-on circuits 26, the detection of the carrier signal initially causing the logic power supply 28 to be enabled, enabling the operation of all logic circuits, as will be described in more detail hereinafter.

The output of serial-to-parallel converter 20 is coupled to a storage register (styli head buffer) 30 which stores the parallel information applied thereto until a complete matrix column has been received by modem 14. A divider 22 which, for the 5 × 7 matrix case, divides the clock output of synchronizer 18 by eight, produces a column clock of 250 hz. The column clock transfers the information stored in storage register 30 in parallel form to styli head amplifiers 42 for every eighth clock bit via inhibit means 32. It should be noted that an eighth bit is transmitted with the input data and is included in each character column. The eighth bit appears at the output of serial-to-parallel converter 20 and is coupled to the input of decoder 24. The eighth bit is required for the particular format utilized in the present invention and is used for synchronization purposes.

Simultaneously with coupling the output of serial-to-parallel converter 20 to storage register 30, the output of serial-to-parallel converter 20 is scanned by decoder 24 which will be described in more detail hereinafter. It should be noted that, although the present invention may be utilized with a single receiver, or printer unit, decoder 24 provides the means for utilizing a plurality of printer units in accordance with the teachings of the present invention. The decoder 24 comprises a plurality of decoding circuits, including the frame (column) synchronizer decoder and the start of line (SOL) decoder which decode control code words and two address decoders which determine whether a particular printer unit is the addressed, or selected, one or if all units, or a group of units, are being addressed. The frame sync decoder generates a signal which effects synchronization of the serial-to-parallel transfer of the incoming 8-bit serial data by synchronizing the column clock produced by divider 22 and the start of line decoder produces a signal which enables the styli heads to move across the recording medium to print a line. Before printing occurs, it must be determined if the printer unit is correctly addressed. The information transferred to decoder 24 is scanned to look for the address code, either group, unit or all call and if a proper address is received and immediately thereafter a frame sync code is decoded, the output from decoder 24 enables power turn-on circuit 26, turning on full power to drive motor control 34, fuser 36, and DC to DC converter 38, enabling character printing. As set forth hereinabove, the detected carrier initially turns on power to the logic circuits in all printer units. At this time, minimal power is applied to each printer unit.

Before any character information is transmitted, a one-zero pattern which represents the carrier frequency is transmitted, and when this is detected, the logic power supply is turned on, setting up the printer for normal operation. When the correct address is detected, the selected unit is switched to full power. The frame synchronization and start of line control codes, appearing between lines and/or at the end of lines, and utilized as described hereinabove, may be printed, unless means are provided to prevent this. Inhibit means 32 is utilized to blank (or reset) the storage register 30 everytime a control code word is received. As shown in the figure, the control code lines are OR gated in gate 40, an output on either one enabling inhibit gate 32 via gate 40 inhibiting transfer to and clearing storage register 30. The address codes are not inhibited in a similar manner since full power is not applied to move the styli heads acoss the recording medium until after a correct address is received and decoded. The output of the frame sync decoder is connected to divider 22 to clear the divider every time a frame sync control word is received, thereby ensuring that the data and column clock are synchronized.

The output of storage register 30, corresponding to one matrix column of the transmitted character, is automatically transferred to a plurality of styli head amplifiers 42. The outputs of the styli amplifiers are coupled to a plurality of styli 46*a*, *b* . . . *f* mounted on a styli card 48. Styli card 48 is affixed to belt 50 which is driven in the direction indicated by arrow *a* head trasport means 52, motor 54 driving head transport means 52 through speed reduction mechanisms not shown in the drawing. The output shaft of motor 54 also drives driving roller 56 which serves to drive recording medium 58 in the direction indicated by arrow *b*. The mechanical details of the printer, i.e. styli, styli card belt, styli belt and recording medium transports are not essential to the present invention and are not set forth herein although the printer disclosed in U.S. Pat. No. 3,166,752 may be utilized in the present invention.

Figure 3A:
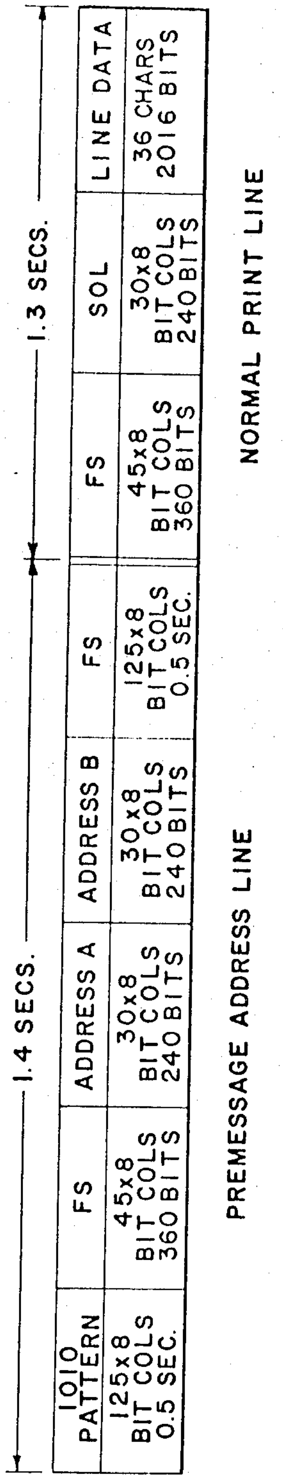
FIGS. 3*a* and 3*b* are typical message and address formats, respectively, utilized in the present invention.
Figure 3B:
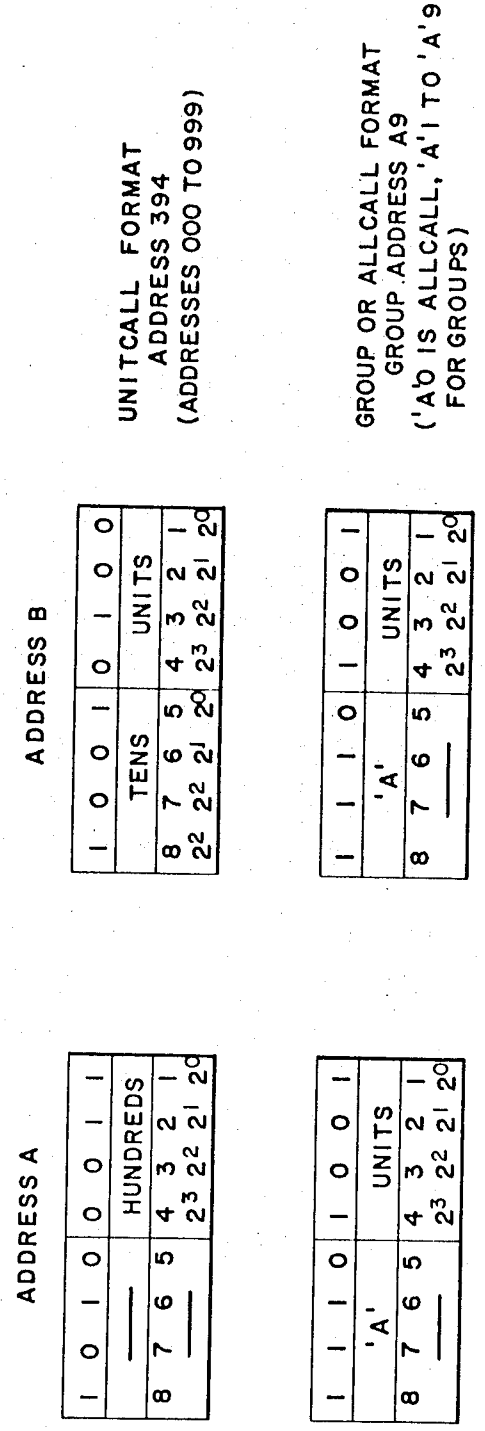

Referring now to FIGS. 3*a* and 3*b*, a typical message and address format is illustrated. FIG. 3*a* shows the message format which comprises a premessage address line of 1.4 seconds and a normal print line of 1.3 seconds. The first 1010 pattern, corresponding to the carrier signal, turns the printer unit logic supply on. The logic is not conditioned to look for the address portion of the premessage address line. The frame sync code (FS) is next and it synchronizes the buffer clock with the input data, thereby effecting synchronization of serial-to-parallel transfer of incoming 8-bit serial data. The printer units are now conditioned to print out characters a column at a time but first it must be determined if a particular printer is the one selected to receive the message. Therefore, the address codes A and B are transmitted and if the proper address, consisting of two eight bit codes or one eight bit code depending whether it is a unit address, or a group or all call address, respecitvely, is received, the main power to the selected printer unit is turned on. Following the address codes is another series of frame sync codes to ensure that the input data and column clock are synchronized. Once the proper address is received, the control for the main power to the printer unit is determined by the frame sync and start of line codes which comprise the first two pulse groups of the normal print line. Once the frame sync and start of line control codes transmission is completed, the printer turns off 1½ seconds later, sufficient time for the line data of 36 characters to be printed.

AS can be seen in the layout of the format, the 1010 pattern of 8 bits is transmitted 125 times, the first and third frame sync code of 8 bits is transmitted 45 times, the 8 bit addresses A and B are transmitted 30 times, and the second frame sync code is transmitted 125 times. At this time, the normal line to line sequence is entered which consists of 45 frame sync codes followed by the 8 bit start of line control code which is transmitted 30 times followed by the 36 characters which make up a printed line. The redundant address and control word code tranmissions ensures tht the proper codes are received at the selected printer unit and that the buffer clock is accurately synchronized with the data bit transitions irregardless of transmission disturbances. Therefore, a typical message format will comprise 5,456 bits including the 36 characters of line data. It should be noted that the 2,016 bits indicated as comprising the line data (36 characters) is transmitted as a 7 × 8 matrix, two eight bit columns of binary 0 being included to define spacing between characters and, as explained hereinabove, the additional eighth bit being included in each column for synchronization pruposes.

After the selected unit has been addressed, the premessage address line portion is no longer transmitted, the normal print line portion being transmitted until a complete message is received.

FIG. 3*b* illustrates a unit call format address and a group or all call format. For the unit call, the last four bits of address A comprises a 1010 bit pattern which does not represent a numerical value in the code transmitted. The first four bits, however, corresponding to the hundreds portion of the address, represent, for the code illustrated, the decimal number 3. The first four bits of address B, corresponding to the units portion of the address, represents the number 4 and the last four bits, corresponding to the tens portion of the address represents the number 9. Therefore, taken together, addresses A and B represent unit call 394, or in other words, a printer unit representing this number will be selected.

In the A address portion of the group or all call format, the first four bits transmitted (1110) are given an arbitrary meaning, such as the letter A. The last four bits correspond to the group being called and in the example illustrated, group 9 is being called. If the last four bits correspond to 0, i.e. a bit pattern of 0000, the address AO represents an all call message whereas addresses, represented by the notation A1 to A9, represent group calls. In group or all call formats, referred to as multiple calls, addresses A and B are identical for the particular printer and transmission formats selected.

Figure 4:
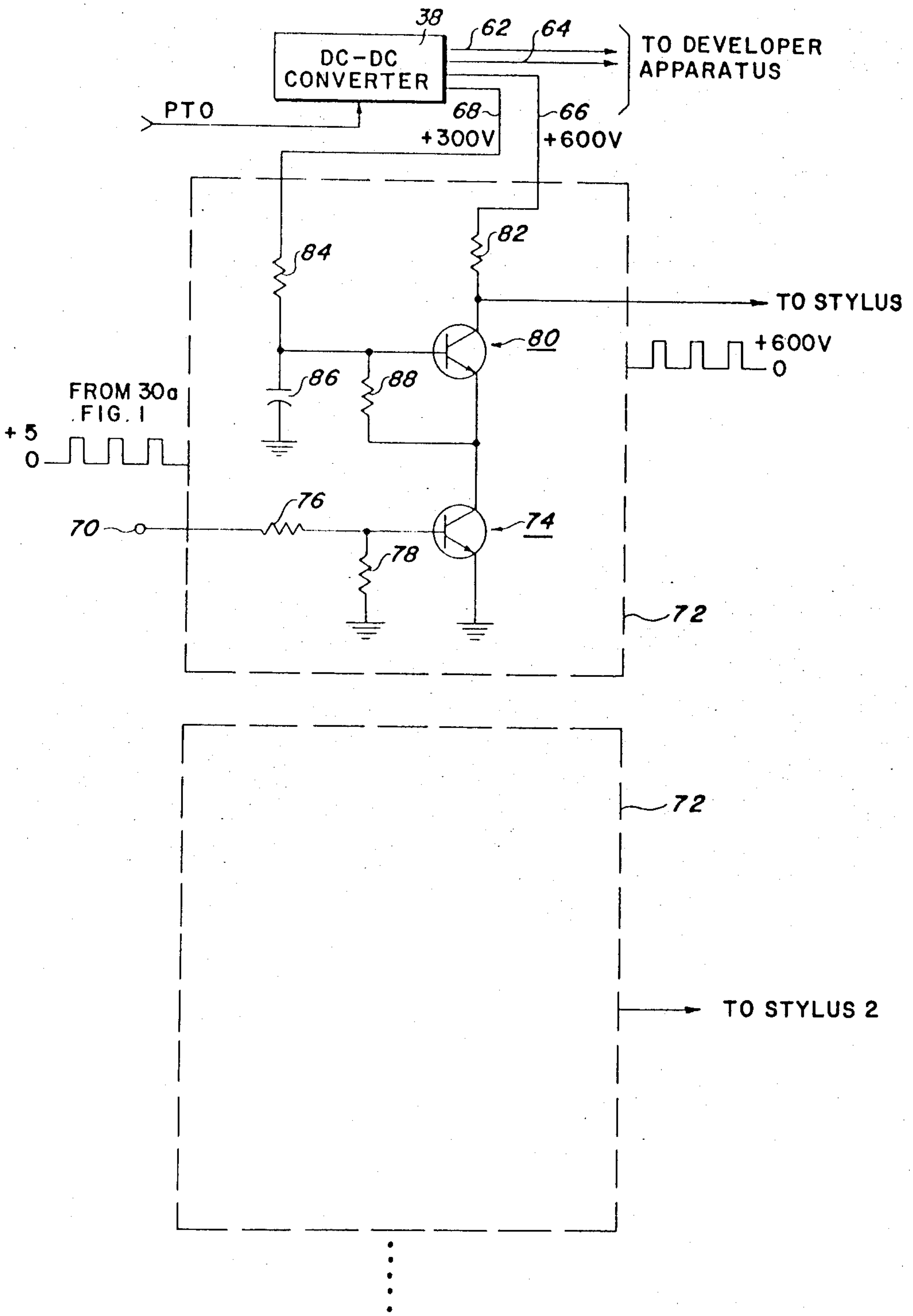
FIG. 4 is a schematic diagram of a stylus head amplifier.

Referring now to FIG. 4 there is shown a partial schematic and block diagram of a DC or DC converter and the stylus amplifier as utilized in the present invention. As will be described hereinafter, when the correct printer unit is addressed a "power turn on", PTO, signal is generated and applied to the DC or DC converter 38. Since DC to DC converters are well known in the art a detailed description therein will not be given. Multiples of the input DC voltage may be obtained at the output of converter 38 of both positive and negative polarities. In the block diagram shown, voltages appearing on output leads 62 and 64 are coupled to the printing unit developer to supply power to appropriate apparatus thereat. The outputs on leads 66 and 68 corresponding to 600 volts and 300 positive volts, respectively, are coupled to the stylus amplifiers as will be described hereinafter. The stylus amplifier for the first stylus head is described in detail only since the stylus amplifiers for the remaining stylus heads are identical thereto. Each output signal from storage register 30 (FIG. 1) is applied to the particular stylus amplifier which represents the same row position as that signal. For illustrative purposes, output lead 30*a* of storage register 30 is coupled to the input terminal 70 of stylus amplifier 72. The input to terminal 70 comprises a pulse train of alternating pulses varying between a voltage level of 0 and +5 volts. A voltage level of +5 volts indicates that the transmitted character element, arranged in the format shown in FIG. 1(*a*), is not to be printed as a dot at the corresponding styli row position while 0 volts indicates that a dot will be printed at the associated styli row. The input pulse train is coupled to the base electrode of transistor 74 via a bias network comprising resistors 76 and 78. The output at the collector of transistor 74 is applied to the emitter of transistor 80. The 600 volt output from DC to DC converter 38 is applied to the collector of transistor 80 via resister 82 and the 300 volt output from converter 38 is coupled to the base electrode of transistor 80 via resistor 84. The base electrode of transistor 80 is coupled to ground via capacitor 86 while the emitter and base electrodes of transistor 80 are connected together by resistor 88. The output appearing at the collector of transistor 80 is coupled to the associated stylus head. The collector output corresponds to a pulse train comprising pulses varying between a voltage level of 0 volts and +600 volts, the 600 volt output energizing the associated stylus head to cause recording medium 56 to be marked in the shape of a dot. Referring to FIG. 1(*a*), if the character T is to be printed, of the seven styli array, assuming that stylus amplifier 72 corresponds to $R_7$, a pulse will be coupled to stylus head 46(*a*) to print out the dot corresponding to $C_1$. In this first column, no other stylus head will be energized.

In operation, transistors 74 and 80 both are either in saturation or in cut-off. The +5 volt signal will drive transistor 76 into saturation assuming it is initially in cutoff. Capacitor 86 slows the rate of decrease of the collector voltage on transistor 74 to approximate the collector voltage of transistor 80. When a zero voltage level appears at input terminal 70, both transistors are cut off and the voltage at the collector of transistor 74 begins to rise, slowed down codes capacitor 86 to approximate the collector voltage of transistor 80. This prevents an excess of voltage appearing across either transistor.

Figure 5:
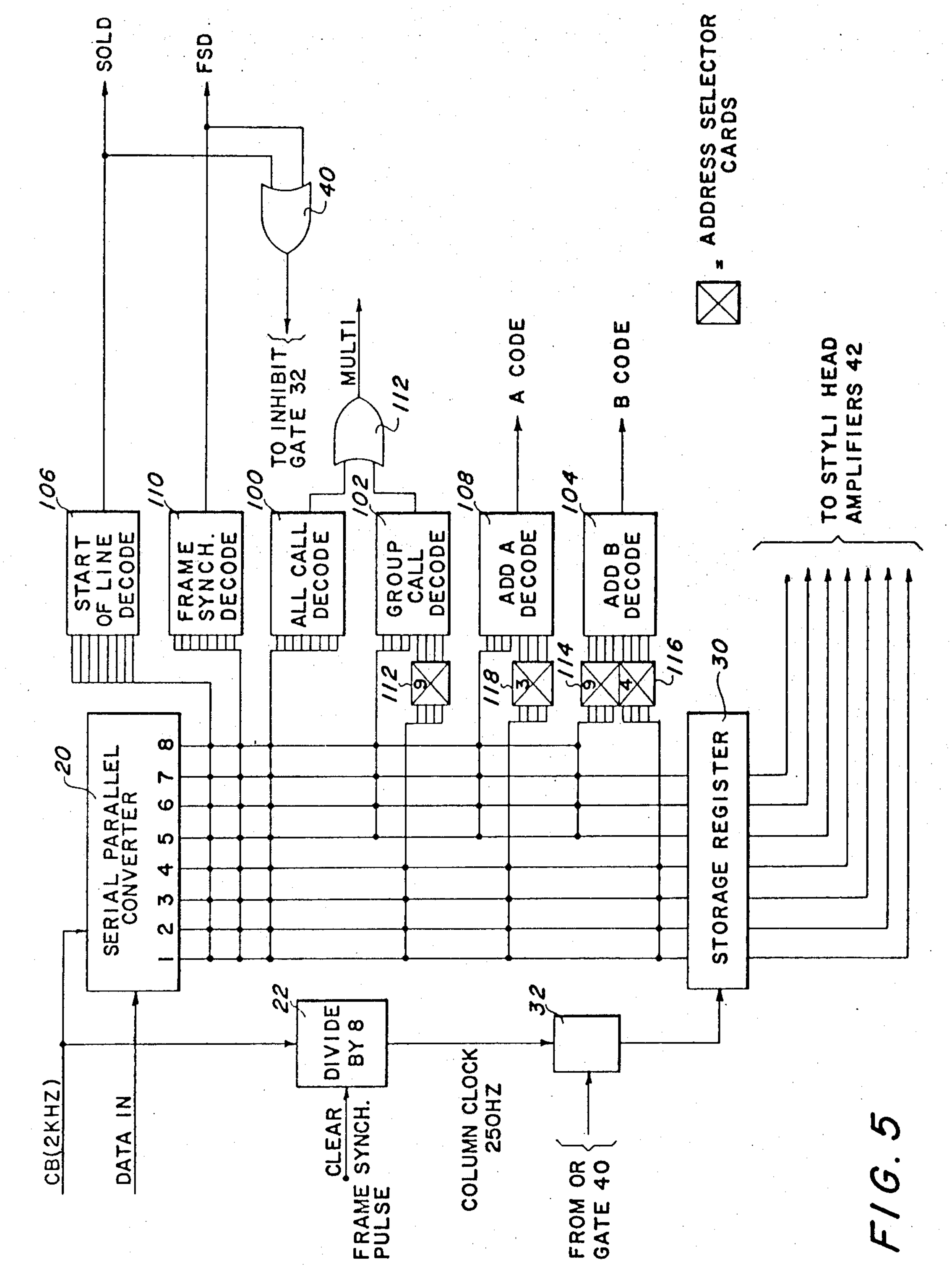
FIG. 5 is a schematic diagram of the decoding portion logic of the novel reproducing system of the present invention.

Referring now to FIG. 5, the inputs to eight input gates, or decoders, 100, 102, 104, 106, 108 and 110 are tapped off the lines running from the serial-to-parallel converter 20 to the storage register (head buffer) 30. The eight input gates continuously scan the eight outputs from converter 20 for a proper sequence of bits corresponding to address codes or control codes and if the eight bits occur then a change in output level is obtained and that information is used to control or address the selected printer.

Elements 112, 114, 116 and 118 represent address selector cards and are interposed between the tapped lines and gates 102, 104 and 108, respectively. Essentially, the selector cards are etched circuit boards having coded lines or runs thereon, the coded lines being connected to the subsequent decoder circuits. By manually inserting a Selector card into an address selector receptacle, a particular address is assigned to a printer unit. In each printer unit, each address selector is used to determine which 4-bit codes (FIG. 3(*b*)) which will be used to make up an address. In the format illustrated in FIG. 3(*a*), the printer unit in the unit call format would be thus addressed to represent unit 394. A selector card is not necessary for the all call mode since it is common to all units. The first half of the group and address A are common to all units and therefore are not selected. The outputs of decoders 100 and 102 are coupled to the input of OR gate 112. A signal at the output of OR gate 112 indicates that a multi-unit (group or all) call has been transmitted. The outputs of decoder 104, 106, 108 and 110 correspond to the detection of address B, start of line control code, address A and frame sync control code, respectively. The decoders provide a signal at its output when the corresponding bit pattern is applied to its input. The decoders may be of the type known in the art and used in digital communication systems. For example, a magnetic core of diode matrix arrangement may be utilized. The outputs of decoders 106 and 110 are coupled to the input of OR gate 40 as described hereinabove, an output at either decoder clearing storage register 30.

Figure 6:
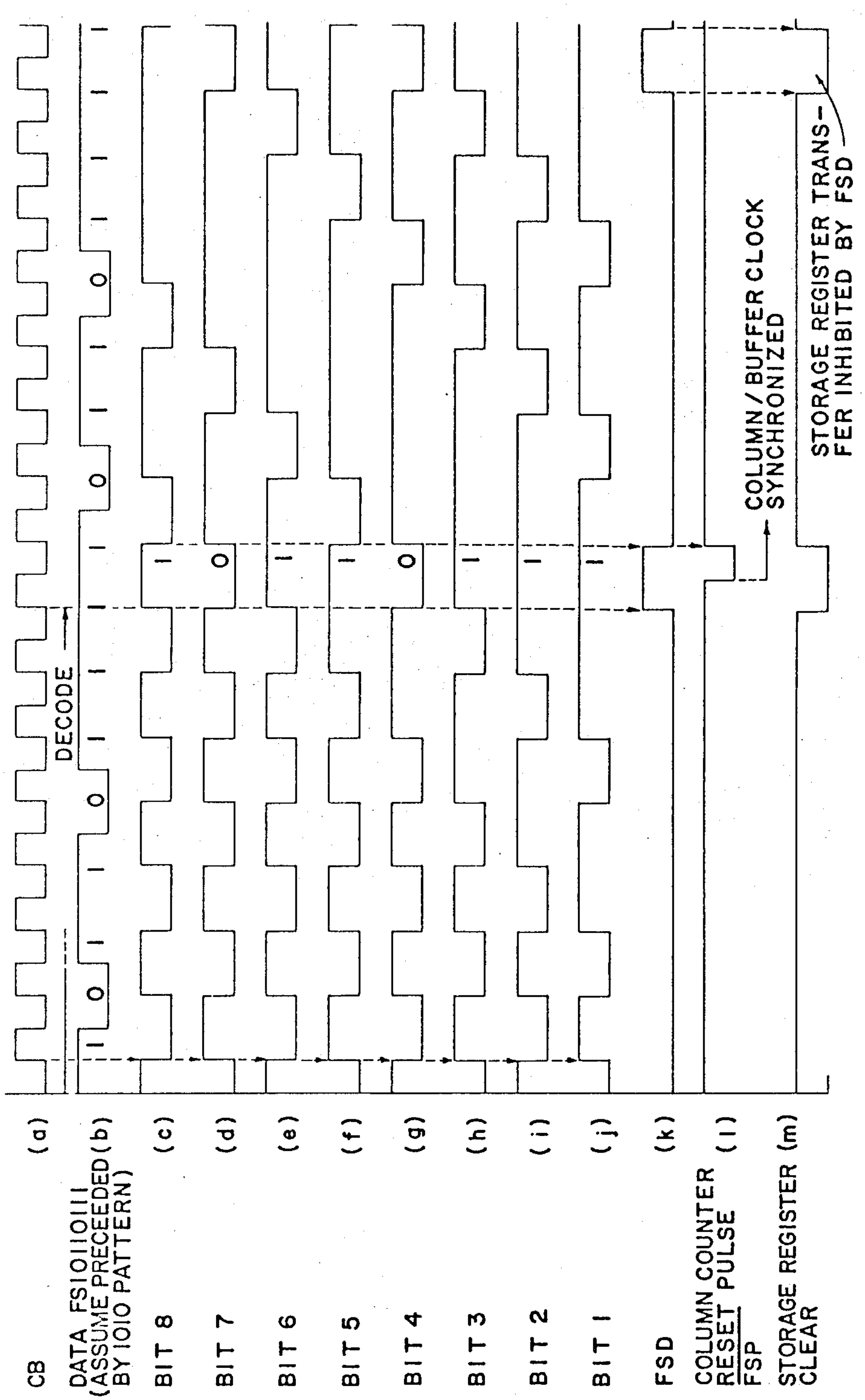
FIGS. 6*a*–6*m* and 7*a*–7*e* are waveforms associated with the logic diagram of FIG. 5.

Referring now to FIGS. 6(*a*) – 6(*m*), waveforms illustrating the decoding operation of FIG. 5 are shown. For the format utilized in the printing units of the present invention, the frame sync portion of the input data comprises an eight bit pattern 10110111. FIG. 6(*a*) shows the clock pulses produced at the output of synchronizer 18 (FIG. 1) and comprises an alternating pulse train of binary ones and binary zeros. FIG. 6(*b*) illustrates the frame sync portion as set forth hereinabove. FIGS. 6(*c*) – 6(*j*) correspond to bits 8, 7, 6, 5, 4, 3, 2, 1, respectively, generated at the output of serial-to-parallel converter 20. As can be readily observed, at the time the leading edge of the eighth clock pulse has occurred the eight bits appearing at the output of serial-to-parallel converter 20 corresponds to frame sync pattern 10110111. At this time, a pulse signal FSD is generated indicating that the frame sync code has been detected. This is shown in FIG. 6(*k*). The output of frame sync decoder 110 (FIG. 5) is gated with the trailing edge of the eighth clock pulse and produces a column counter reset pulse FSP (FIG. 6(*l*)) which resets counter 22. The column clock is thus synchronized with the clock CB. FIG. 6(*m*) shows the frame sync decode signal FSD inhibiting transfer to and clearing storage register 30.

Figure 7:
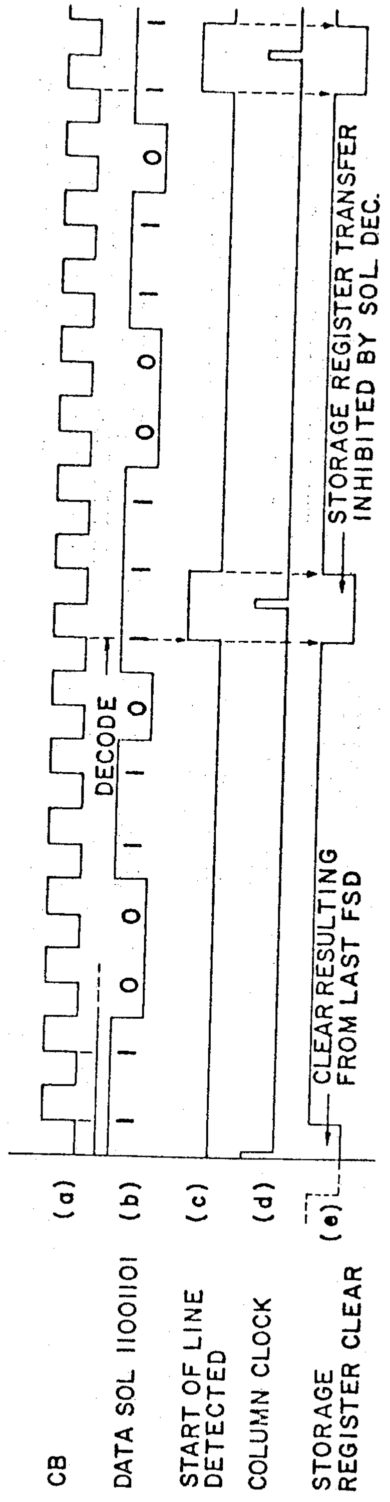

FIGS. 7(*a*) – 7(*e*) illustrate waveforms produced by start of line decoder 106. FIG. 7(*a*) shows the clock pulses CB. In the format of the present invention, the start of line control word is assigned the binary symbol 11001101 as shown in FIG. 7(*b*). The eight bits comprising the start of line code are not shown but would occur in a manner similar to the occurrence of the frame sync code shown in FIGS. 6(*c*) – 6(*j*). At the time when the start of line signal is detected, a pulse is generated as shown in FIG. 7(*c*). FIG. 7(*d*) illustrates a buffer clock pulse occurring during the time duration of the start of line decode pulse shown in FIG. 7(*c*). As with the frame sync control decoded signal, transfer to storage register 30 is inhibited and the register is cleared during the occurrence of the start of line control code.

As set forth hereinabove with eference to FIG. 1(*a*), inhibiting transfer to and clearing the storage register at these times prevents the start of line and frame sync codes from being printed on recording medium 58.

Although not shown in the drawings, any address code may be decoded in the same manner as the frame sync code and the start of line code described hereinabove, the detected multi-call and unit call bit pattern being determined by the address selector cards.

Figure 8:
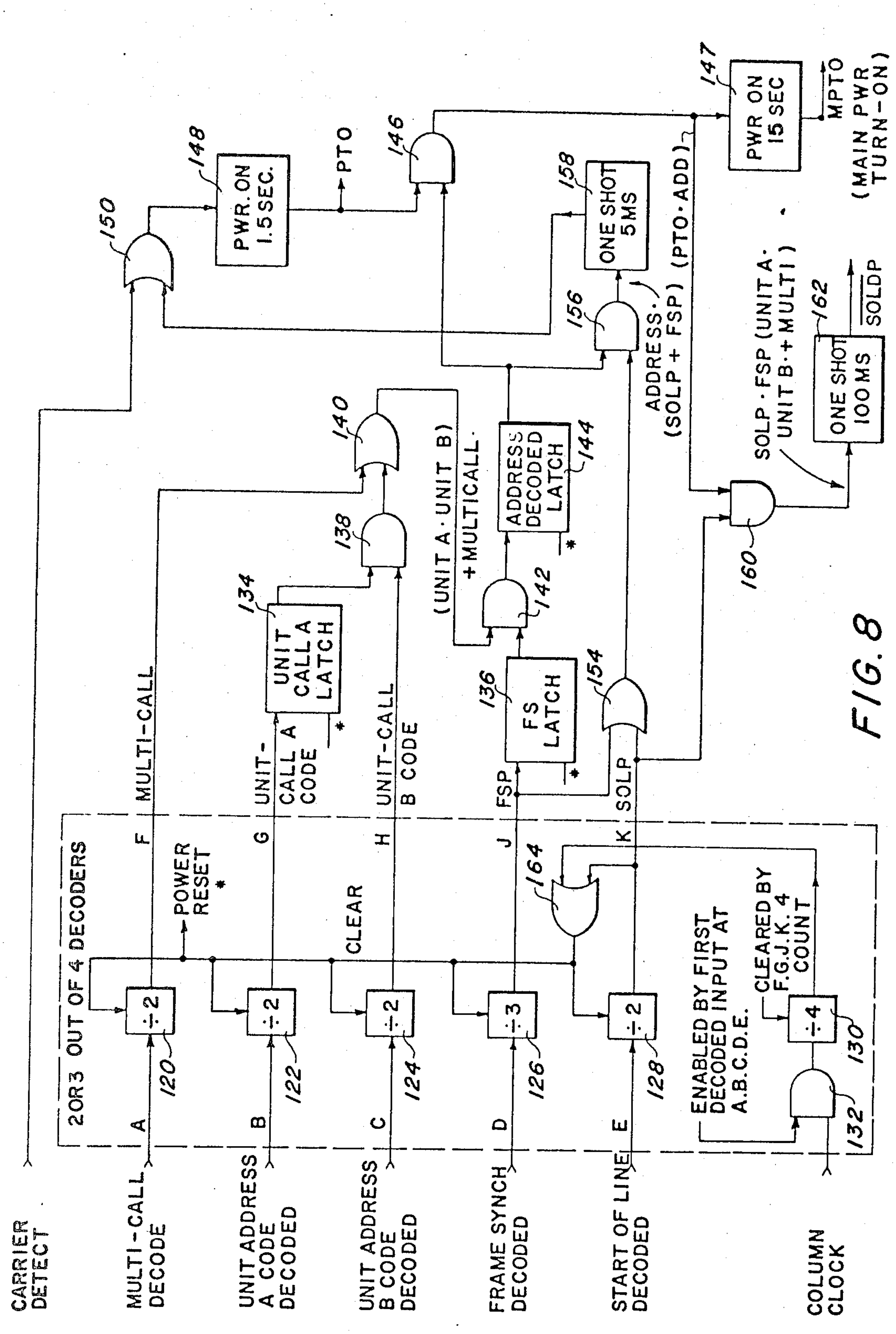
FIG. 8 is a schematic diagram of the control logic for switching a printer unit to full power after it is properly addressed.

Referring to FIG. 8, a control logic diagram for the power turn-on circuit 26 of FIG. 1 is illustrated.

To ensure proper synchronization and addressing, decoding circuits are utilized in FIG. 8 to detect two or three out of four successive control and address code sequences. Each time an address code or control code is detected on lines A, B, C, D and E, the number of occurrences are counted in counters 120, 122, 124, 126 and 128, respectively, and simultaneously with the detection of an address or control code, counter 130 starts counting (column time) pulses. The column clock pulses pass to counter 130 when AND gate 132 is enabled by an output on lines A, B, C, D or E. Therefore, at the same time that address codes and control codes are being counted, column times are also being counted. In the case of address codes, if two address codes are counted before four column times are counted, a proper address is received and that information is stored in the form of a latch, or signal level. In this case, a unit A call sets unit call A latch 134, latch 134 remembering that the first half of the unit address has been received. In the case of frame sync code, if three frame sync codes are counted before four column times are counted, the information is stored in frame sync code latch 136. The frame sync code will reset or synchronize the column clock and if an erroneous frame sync code is received, or a frame sync code in the wrong time interval, the column clock will be erroneously synchronized and therefore a proper address code or start of line code will not be received after that and the characters will not be synchronized, the final character printout being in error. The technique described hereinabove, wherein frame sync code is counted, or decoded, three out of four clock times instead of two out of four clock times as with the other codes, assures that frame sync is actually frame sync and not noise. Under worst case operating signal/noise (S/N) ratios, the probability of receiving erroneous frame sync pulses will be higher for the 2/4 than for the ¾ four decoding methods. Once the first part of the unit call address is detected, the unit call A latch is set at the time the input buffer (serial-to-parallel) converter 20 is being scanned for the second portion of the unit address. When that is received two times in the interval of four column times, an output is generated by counter 124 which is AND gated in AND gate 138 with the unit call A latch. The output of AND gate 138 is OR gated in OR gate 140 with the multicall, or group call, address which in turn is AND gated in AND gate 142 with a received frame sync pulse. The output of AND gate 142 sets latch 144 which indicates that a proper address has been received Latch 144 is AND gated in AND gate 146 with the output of a one-shot multivibrator 148. The output of AND gate 146 enables one-shot multivibrator 147, the output of which corresponds to main power turn-on, MPTO. This signal allows full power, i.e. 4 amps, to be applied to the rest of the printer unit, i.e. the drive motor, fuser, DC to DC converter, fuser controller, etc. The one-hot multivibrator 148 is enabled by the detection of the carrier signal, represented by the initial 1010 message pattern, which is applied to OR gate 150. The output of OR gate 150 enables one-shot 148 which turns on the initial, or auxilary, power supply 28 (about 500 ma) enabling all the logic circuits at the printer.

Figure 9:
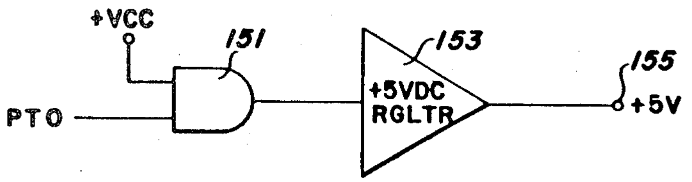
FIG. 9 is a block diagram of apparatus for turning on the digital logic power supply.

FIG. 9 is a block diagram for turning on power to the printer logic circuits. The power turn on signal, PTO, is coupled to one input of AND gate 151. A positive potential +Vcc is applied to the other input of AND gate 151. When the PTO signal is generated at the output of single-shot 148, the AND gate is enabled and enables a five volt d-c regulator 153. The output of the regulator appearing at terminal 155 applies power to the printer logic circuits.

The frame sync output pulse produced by counter 126 is coupled to one input of OR gate 154, the other input thereof being connected to the start of line output of counter 128. The output of OR gate 154 is AND gated in gate 156 with the output of latch 144. The output of AND gate 156 drives a one-shot multivibrator 158 having a time constant of approximately 5 milliseconds, the output thereof being coupled to one shot 148 via OR gate 150.

After entering the addressed state, indicating that the address contained in the premessage address line portion of the incoming data is valid, the printer will remain in this state for at least 1.5 seconds as determined by single-shot 148. If a frame sync or start of line code is received before the 1.5 seconds expires, the printer will remain in the addressed, or full power, state for another 1.5 seconds or one line time. Therefore, for the printer to remain in the addressed state for a time longer than one line time, it must receive the frame sync or start oF line code prior to every line that is to be printed, otherwise the printer will return to its initial, or standby state. The output of AND gate 156 provides this function. In all other printers, logic power will be switched off approximately 1.5 seconds after the 1010 pattern input has ended. At the end of a message, the digital logic power supply is disabled but timer 147 allows the printer to operate an additional 15 seconds, to ensure complete message fusing.

The output of counter 128, corresponding to the start of line pulse is coupled to one input of AND gate 160, the other input of which is coupled to the output of AND gate 146. The output of AND gate 160, corresponding to the time when line printing is to begin, is coupled to one-shot 162 which provides a 100 millisecond pulse to a solenoid latch coil, enabling the print heads to be driven across the recording medium.

Counter 130 is reset, or cleared, by an output on either leads F, G, H, J or K or, if counter 130 reaches a count of our before outputs appear on the aforementioned leads, the counter resets itself.

The counter 120, 122, 124, 126 and 128 and latches 134, 136 and 144 are reset by a signal appearing at the output of OR gate 164. An output signal is generated by OR gate 164 when a start of line pulse is produced by counter 126 or column clock counter 130 generates a pulse, which ever occurs first.

Figure 10:
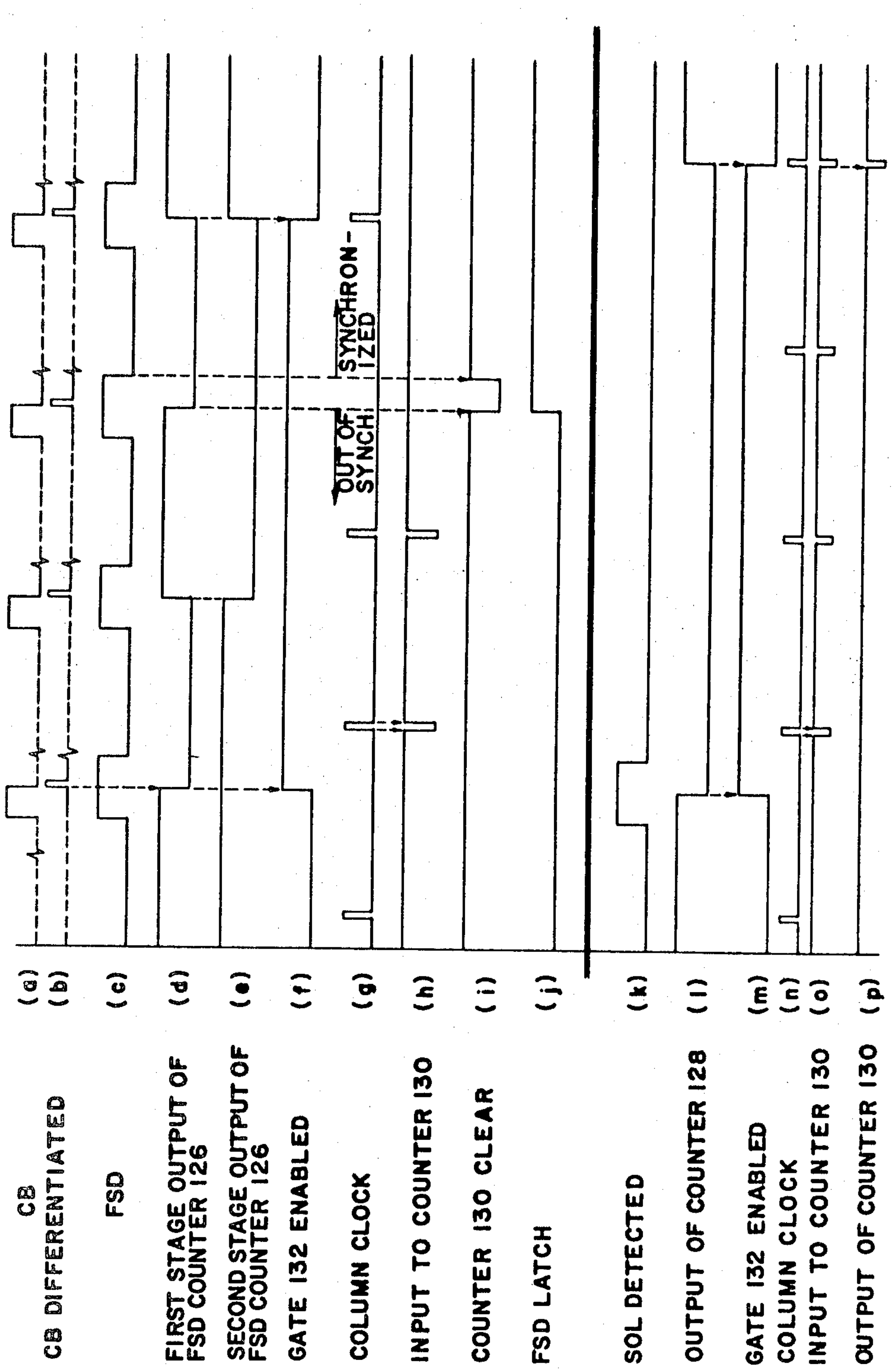
FIGS. 10*a*–10*p* are waveforms associated with the control logic shown in FIG. 8.

FIGS. 10*a* – 10*p* illustrate the frame sync decode waveforms generated by the control logic of FIG. 8. FIG. 10*b* shows pulses generated by differentiating the clock pulses of FIG. 10*a*. It should be noted that the interpulse times of the pulses shown in FIGS. 10*c* – 10*j* are not to scale and should be read accordingly. FIG. 10*c* is the frame sync decode (FSD) input to the frame sync counter 126, the first stage output thereof being shown in FIG. 10*d* and the second stage output being shown in FIG. 10*e*. The trailing edge of the second pulse in FIG. 10*d* is generated for every third FSD pulse. The frame sync pulse, FSP, latch is shown in FIG. 10*j* . The counter is enabled by the FSD input applied to gate 132 as shown in FIG. 10*f*.

FIG. 10*g* shows the column clock pulses applied to AND gate 132, the out of sync pulses appearing on the left hand side of the dotted lines being in sync after the FSD signal has been detected as described hereinabove. The pulses applied to the input of counter 130 are shown in FIG. 10*h*. The output of counter 130 is cleared by the trailing edge of the output pulse generated by the first stage of counter 126 as shown in FIG. 10*i*.

FIGS. 10*k* – 10*p* illustrate the situation when counter 130 counts four pulses before the start of line or frame sync pulses are generated by counters 128 and 126, respectively. For illustrative purposes, assume FIG. 10*k* shows a detected start of line pulse applied to counter 128. The output of counter 128 is shown in FIG. 1. The output of counter 128 enables gate 132 to pass the column clock to the counter 130 as shown in FIG. 10*m*. When AND gate 132 is enabled the column clock pulses are allowed to pass to the counter 130. Column clock pulses are shown in FIG. 10*n*, the pulses being applied to counter 130 being shown in FIG. 100. The output of counter 130 is shown in FIG. 10*p* and is generated for every fourth column pulse applied thereto. This pulse resets decoder counters 120, 122, 124, 126 and 128, latches 134, 136 and 144 and itself as shown in FIG. 8.

Figure 11:
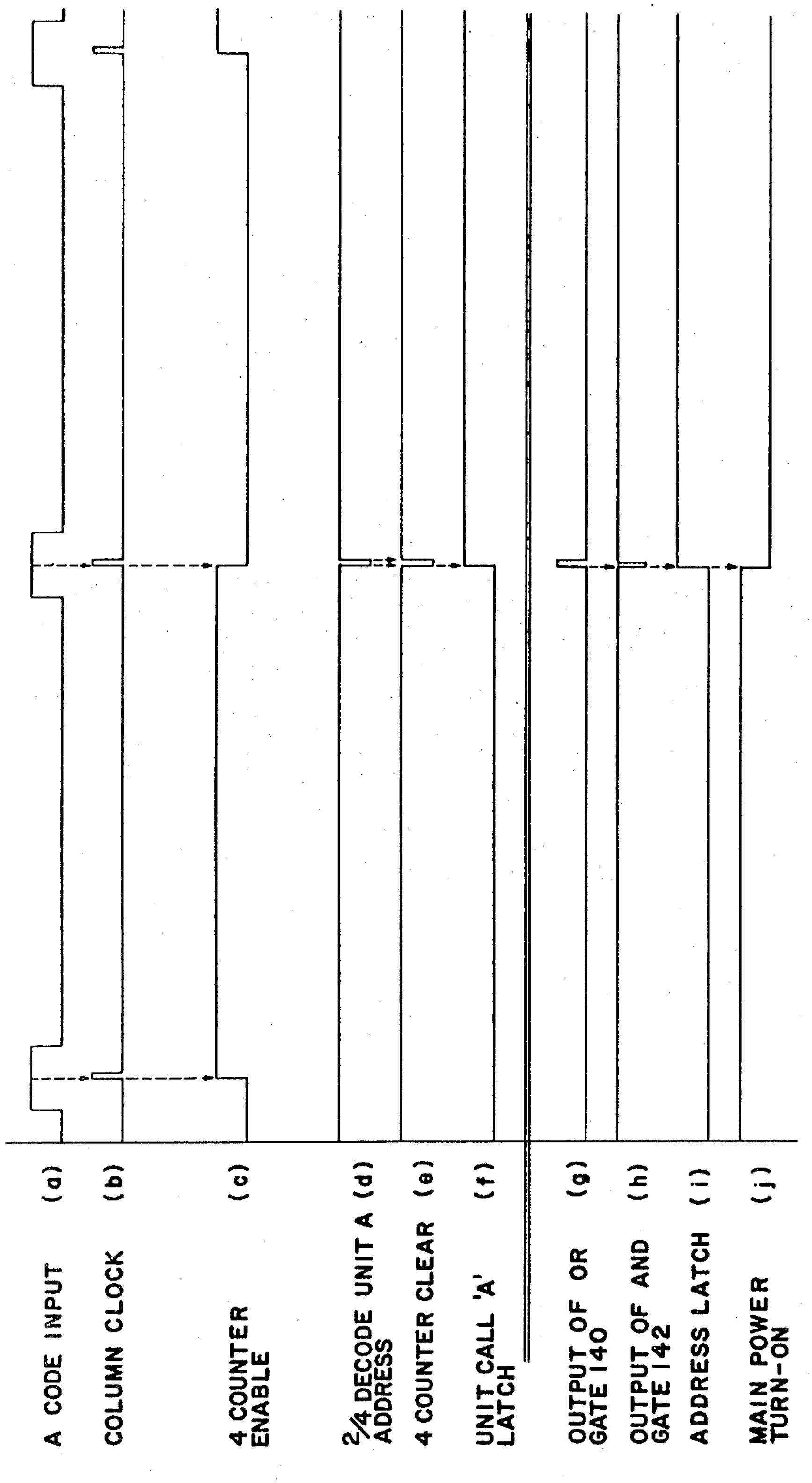
FIGS. 11*a*–11*j* are additional waveforms associated with the control logic shown in FIG. 8.

Referring to FIGS. 11*a* – 11*j*, the generation of the two out of four unit A address pulse and the setting of unit call A latch is illustrated. The A address decode input is shown in FIG. 11*a* and the column clock input to AND gate 132 is shown in FIG. 11*b*. The four counter 130 is enabled at the detection of the first decode and is reset at the detection of the second decode as shown in FIG. 11*c*. The output of the two out of four counter 122 is shown in FIG. 11*d*. The four counter 130 is cleared at the detection of the second decode, as shown in FIG. 11*e*. The unit call A latch 134 is enabled at the detection of the second decode as shown in FIG. 11*f*. The output of OR gate 140, assuming that unit call A latch 134 is set and a two out of four unit B address pulse has been generated by counter 124, is shown in FIG. 11*g*. The output of AND gate 142, assuming that FS latch 136 is set, is shown in FIG. 11*h*. The negative output pulse of AND gate 142 sets address latch 144, initially at zero, as shown in FIG. 11*i*. The setting of latch 144 maintains the logic circuit power on via single shot 148.

Figure 12:
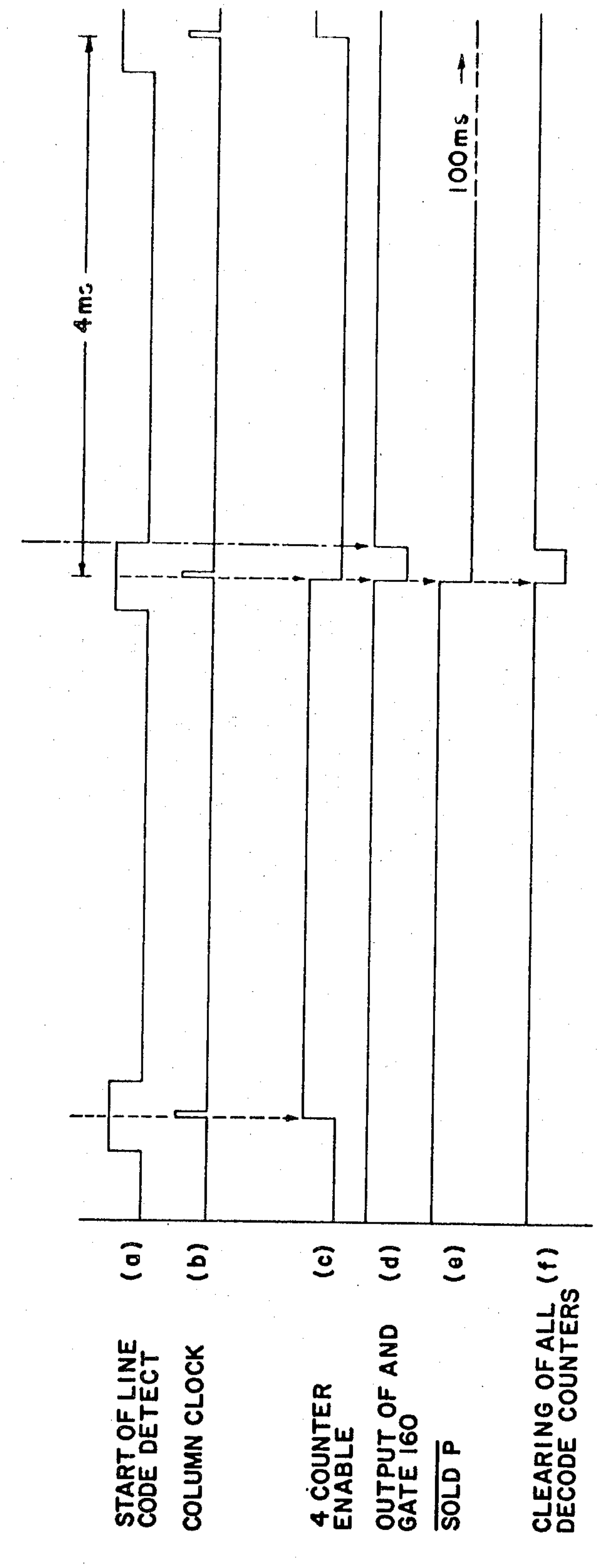
FIGS. 12*a*–12*f* are additional waveforms associated with the control logic shown in FIG. 8.

FIGS. 12*a* – 12*f* illustrate the two out of four detection of the start of line code, the resetting of all the two out of four counters and the generation of the solenoid drive pulse. FIG. 12*a* shows the detection of the first and second start of line code input while FIG. 12*b* is the column clock. FIG. 12*c* shows the enabling of four ounter 130 at the detection of the first decode and counter resetting at the detection of the second decode. FIG. 11*d* shows the output of AND gate 160 assuming that at the time of the second decode, AND gate 146 is enabled. The output of AND gate 160 enables one-shot 162, generating a 100 millisecond pulse to drive the solenoid, as shown in FIG. 12*e*. FIG. 12*f* shows the clearing of all the decode counters 120, 122, 124, 126 and 128 at the time coincidence of the second decode and the column clock.

Figure 13:
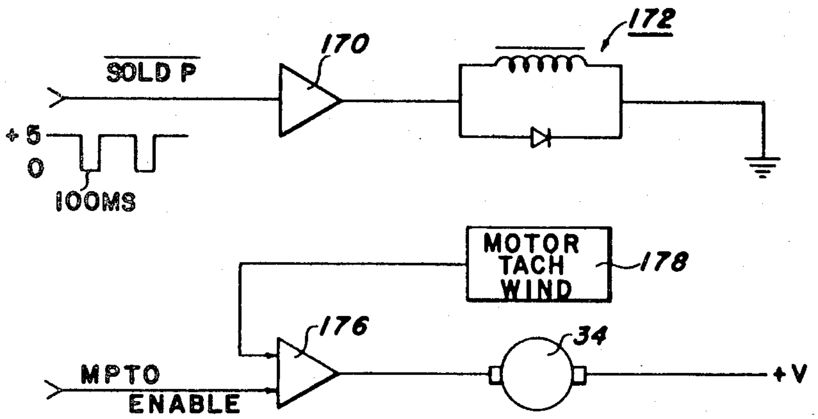
FIG. 13 is a schematic diagram of the start of line solenoid driver and the motor control circuit.

Referring now to FIG. 13 a simplified block diagram of the circuitry used for starting line printing and for controlling motor 54 is shown. The inverted start of line decoded signal $\overline{\text{SOLD P}}$, generated at the output of one shot 162 shown in FIG. 8, is connected to one input of amplifier 170. The input $\overline{\text{SOLD P}}$ comprises a series of negative pulses 100 milliseconds long which varies between the 0 and +5 volt levels. The input $\overline{\text{SOLD P}}$ is coupled to start of line solenoid coil 172 via amplifier 170.

As described in the aforementioned U. S. Pat. No. 3,166,752, when the solenoid coil 172 is energized, an armature member associated therewith is pulled away from a fastener, or stop member, which connects each styli unit to belt 50. The stop member projects from the styli body and is engaged by the top portion of the armature until solenoid coil 72 is energized, permitting the movable electrodes to scan across recording medium 58. It should be noted that other techniques can be used to control the start of line sequence, including for example, a wrap-spring clutch coupling the drive motor shaft to the head transport mechanism, the clutch being engaged during the start of line signal.

The main power turn-on signal, MPTO, generated at the output of multivibrator 147 shown in FIG. 8 is coupled to one input of amplifier 176, enabling the amplifier to go into regulation. The output of amplifier 176 energizes drive motor 34. The shaft speed of motor 34 is controlled by measuring the speed by means of a motor tachometer winding 178 which generates an electrical signal proportional to shaft speed to the other input of amplifier 176. When the electrical signal representing shaft speed equals a reference voltage internal to amplifier 176, the shaft is rotating at a uniform speed.

It should be noted that in the preferred embodiment the recording medium comprises an electrostatic paper capable of supporting electrostatic charge on its surface. The styli in this embodiment are capable of applying electrostatic charge to the areas of the paper corresponding to the position thereof when the styli are energized by the associated styli amplifiers 42.

Other forms of recording techniques may be utilized. For example, the recording medium may comprise precharged photosensitive paper, the recording devices being sources of illumination arranged normal to the direction of paper movement. When a source of illumination is energized, the area of the paper adjacent the source is discharged. A metallized paper tape may be used as the recording medium, the energization of a styli burning off a portion of the metal surface, thereby leaving a mark.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method of applying power to at least one of a plurality of recording means at locations remote from a transmitter, said power being sufficient to enable selected ones of said recording means to print characters transmitted thereto from said transmitter, said transmitter transmitting an information signal in a format which includes carrier, address and character information portions comprising the steps of:

a. transmitting said carrier portion of said information signal to apply power of a first level to all said recording means, thereby conditioning each recording means for reception of said address portion of said information signal, b. transmitting a predetermined address in said address portion of said information signal whereby the recording means corresponding to said predetermined address are selected and thereby conditioned to receive the character portion of said information signal, and c. applying power of a second level to said selected recording means, in response to the reception of said predetermined address whereby said selected recording means are enabled to print characters.

2. The method as defined in claim 1 further including the step of removing the first level power applied to the non-selected recording means.

3. The method as defined in claim 1 further including the step of conditioning said recording means to respond to a different predetermined address.

4. Apparatus for recording the character portion of a transmitted information signal having a format which comprises carrier, address and character information portions, the characters encoded into a serial pulse train corresponding to elements of a character matrix and comprising $N_c$ successive groups of $N_r$ electrical signals, said character matrix comprising $N_c$ columns and $N_r$ rows, comprising:

a. means for converting said serial pulse train into a parallel signal on $N_r$ output lines, b. $N_r$ electrically operative drive units coupled to said $N_r$ output lines, c. $N_r$ styli coupled to said $N_r$ drive units, d. means for feeding a recording medium in a first direction and for transporting said styli in a second direction across said recording medium whereby successive portions of said recording medium are traversed by said styli said styli being disposed in a linear array, of $N_r$ rows, each of said styli being energized by said drive units to record a matrix pattern on said recording medium in accordance with the associated signals in said groups, e. means responsive to said carrier portion of said information signal for applying power of a first level to said recording apparatus, thereby conditioning the recording apparatus for reception of said address portion of said information signal, and f. means responsive to said address portion of said information signal for applying power of a second level to said recording apparatus, thereby enabling said recording apparatus for printing said character portion of said information signal.

5. The apparatus as defined in claim 4 wherein said converting means comprises a serial-to-parallel register and further including a storage register connected to the $N_r$ output lines for coupling the character information thereon to said drive units when a complete column of information is stored therein.

6. An information transmission and recording system comprising:

a. means for transmitting an information signal in a format comprising carrier, address and character information portions from a base station, said character being encoded into elements of a matrix comprising $N_c$ successive groups of at least $N_r$ electrical signals, said character matrix comprising $N_c$ columns and $N_r$ rows and, b. recording means comprising:

1. means for deriving from each encoded character a serial pulse train of $N_c$ groups each of $N_r$ binary signals, the groups representing the columns of the matrix in turn and the signals in each group representing the elements of the character matrix,
2. means for converting said serial pulse train to a parallel signal on $N_r$ output lines,
3. $N_r$ electrically operative drive units coupled to said $N_r$ output lines,
4. $N_r$ styli coupled to the output of said drive units,
5. means for feeding a recording medium in a first direction and for transporting said styli in a second direction across said recording medium whereby successive lines of said recording medium are scanned, said styli being disposed in a linear array of $N_r$ rows, each of said styli being energized by said drive units to record a matrix element on said recording medium in accordance with the associated signals in said groups,
6. means responsive to said carrier portion of said information signal for applying power of a first level to said recording apparatus, thereby conditioning the apparatus for the reception of said address portion of said information signal, and
7. means responsive to said address portion of said information signal for applying power of a second level to said recording apparatus, thereby enabling said recording means to print said character information.

7. The system as defined in claim 6 further including a plurality of additional recording means at locations remote from said transmitting means and means at each of said recording means for responding to said carrier portion of said information signal whereby power of a first level is applied to all recording means, each recording means being conditioned to receive said address portion of said information signal.

8. The system as defined in claim 7 further including means at each of said recording means for responding to a predetermined address transmitted in said address portion of said information signal, power of a second level being applied to the recording means responding to said address portion of said information signal whereby the recording means responding to said address portion are enabled to print said character information.

9. The system as defined in claim 8 further including means for removing the power applied to the recording means not responding to said address portion of said information signal.

10. The system as defined in claim 9 further including means for conditioning said recording means to respond to a different predetermined address.

11. The method recited in claim 1 wherein the step of transmitting a predetermined address comprises transmitting said address as a coded digital signal.

12. The combination recited in claim 4 wherein said address portion of said format comprises a coded digital signal.

13. The combination recited in claim 6 wherein said address portion of said format comprises a coded digital signal.

* * * * *